United States Patent [19]

Fujii

[11] 4,327,385
[45] Apr. 27, 1982

[54] CASSETTE LOADING AND UNLOADING DEVICE FOR VIDEO TAPE RECORDER

[75] Inventor: Kazuo Fujii, Osaka, Japan

[73] Assignee: Sanyo Electric Co., Ltd., Osaka, Japan

[21] Appl. No.: 156,653

[22] Filed: Jun. 5, 1980

[30] Foreign Application Priority Data

Jun. 11, 1979 [JP] Japan .............................. 54/73663
Jun. 11, 1979 [JP] Japan .......................... 54/79735[U]

[51] Int. Cl.³ ...................... G11B 15/66; G11B 19/18; G11B 23/04
[52] U.S. Cl. .................................. 360/96.5; 242/198; 360/96.6
[58] Field of Search ............... 360/96.5, 96.6, 93, 360/96.1, 105; 242/197–200

[56] References Cited

U.S. PATENT DOCUMENTS

| | | | |
|---|---|---|---|
| 3,870,247 | 3/1975 | Carisey | 360/96.6 |
| 3,957,225 | 5/1976 | Vogel | 242/198 |
| 4,017,900 | 4/1977 | Katsurayana | 360/96.6 |
| 4,071,859 | 1/1978 | Sami | 360/96.5 |
| 4,087,844 | 5/1978 | Takahashi et al. | 360/96.6 |
| 4,107,747 | 8/1978 | Kumaki | 360/93 |

Primary Examiner—Alfred H. Eddleman
Attorney, Agent, or Firm—Armstrong, Nikaido, Marmelstein & Kubovcik

[57] ABSTRACT

A cassette loading and unloading mechanism for a video tape recorder comprises an eject bar supported for movement between upwardly biased and depressed positions and positioned frontwardly of a cassette holder with its longitudinal extend extending in parallel to the top of the video tape recorder. The cassette holder is held at a set position and an eject position when the eject bar is in the upwardly biased position and in the depressed position, respectively. The eject bar is locked in the depressed position during the positioning of the cassette holder at the eject position so that a relatively large access opening can be available for the insertion and removal of the tape cassette into and from the cassette holder.

5 Claims, 15 Drawing Figures

CASSETTE LOADING AND UNLOADING DEVICE FOR VIDEO TAPE RECORDER

BACKGROUND OF THE INVENTION

The present invention generally relates to a video tape recorder having a capability of recording and/or reproducing video information on a magnetic tape housed within a cassette. More specifically, it relates to a cassette loading and unloading device for the video tape recorder.

As is well known to those skilled in the art, the video tape recorder is equipped with a cassette holder for accommodating a tape cassette. The cassette holder is generally supported for movement between an eject position and a set positions, and the tape cassette can be inserted into and removed from the cassette holder only when the latter is held in the eject position. It is also well known that the video tape cassette for use in the video tape recorder is larger in size than an audio tape cassette for use in a sound recording and reproducing apparatus, requiring a relatively large stroke of movement to be accomplished by the cassette holder.

Figures 1, 2, 3:
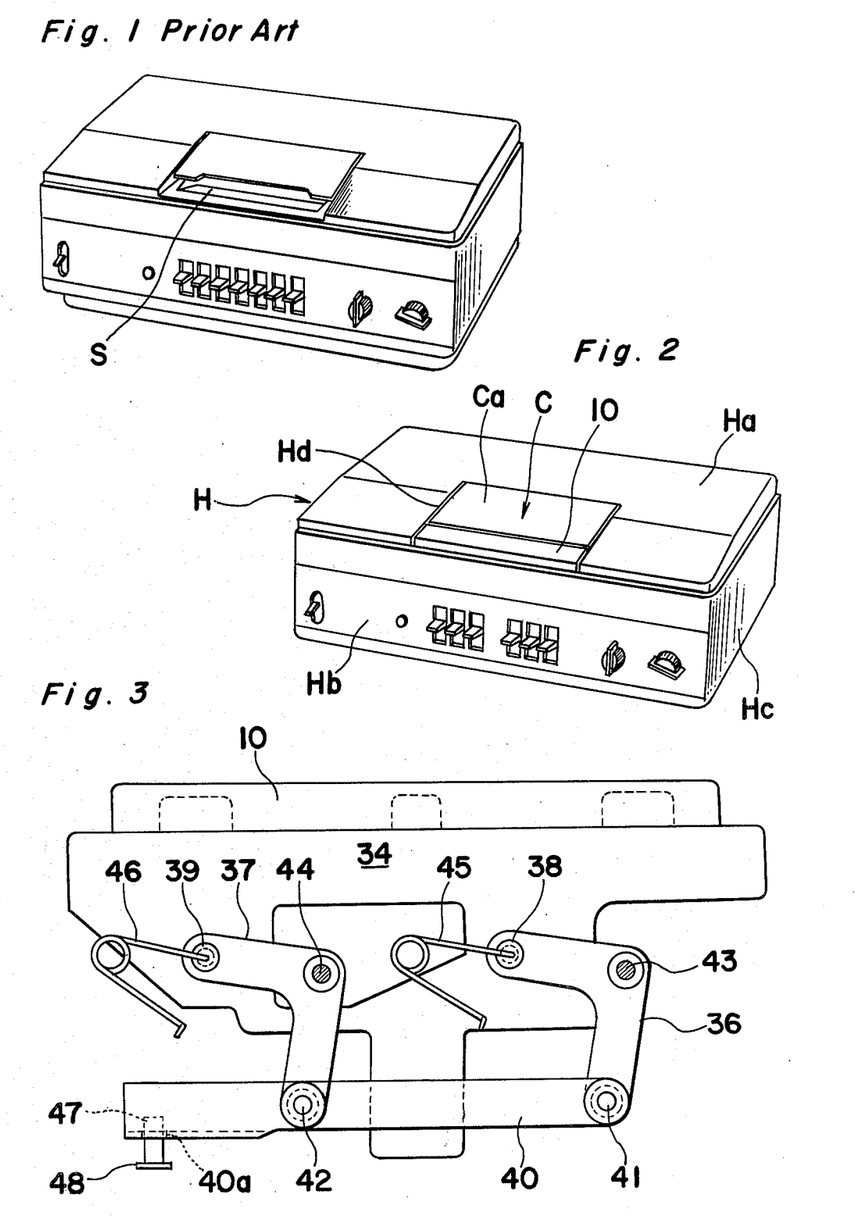
FIG. 1 is a perspective view of a video tape recorder employing the prior art cassette loading and unloading mechanism.
FIG. 2 is a view similar to FIG. 1, showing a video tape recorder in which a cassette loading and unloading mechanism embodying the present invention is incorporated.
FIG. 3 is an elevational view, on an enlarged scale, of an eject bar and its associated parts employed in the cassette loading and unloading mechanism embodying the present invention, said eject bar being shown as held in an upwardly biased position.

In view of the above, as shown in FIG. 1 of the accompanying drawings, the prior art video tape recorder has an access slope S to define an access opening that permits the access of the hand holding the tape cassette when the cassette holder is in the eject position. In other words, since the prior art cassette loading and unloading device is of such a construction that the cassette holder has to be moved a relatively large stroke between the eject and set positions, the design of the video tape recorder as a whole to minimize as compact as possible requires the provision of the access slope S leading to the cassette holder.

However, because of the presence of the access slope S, the opening of the cassette holder through which the cassette is selectively inserted into and removed from the cassette is exposed to the outside of the video tape recorder through the access opening even when the cassette holder is held in the set position, thereby involving some disadvantages and inconveniences. For example, when and so long as the video tape recorder having the prior art cassette loading and unloading device is not in use with the empty cassette holder held in the set position, the cassette holder still opens wide to the outside and, therefore, foreign matters tend to enter the cassette holder through the access opening. In the worst it may happen, some foreign matters so entering the cassette holder will do much damage to precise and delicate electrical and/or mechanical component parts of the video tape recorder. On the other hand, when and so long as the video tape recorder is in use with the loaded cassette holder held in the set position, some foreign matter if large in size and tending to enter the cassette holder will give a shock to the cassette within the cassette holder, thereby constituting a cause of distorted recording or reproduction of video information.

SUMMARY OF THE INVENTION

Accordingly, the present invention has been developed in view to substantially eliminating the disadvantages and inconveniences inherent in the prior art cassette loading and unloading device and is intended to provide an improved cassette loading and unloading device which does not require the employment of such an access slope as required in the prior art video tape recorder.

Another important object of the present invention is to provide an improved cassette loading and unloading device of the type referred to above, wherein the stroke of movement of the cassette holder between the eject and set positions is minimized, thereby enabling the manufacture of a video tape recorder in a relatively compact size.

A further object of the present invention is to provide an improved cassette loading and unloading device of the type referred to above, wherein the cassette holder can readily be removed from the body of the video tape recorder when so required, for example, during the servicing, only by adjusting a single threaded fastening element.

A still further object of the present invention is to provide an improved cassette loading and unloading device of the type referred to above, which is effective to render the video tape recorder to be good-looking and pleasing in appearance to the eyes without involving the increased manufacturing cost.

In order to accomplish these and other objects of the present invention, a cassette loading and unloading device embodying the present invention includes an eject bar which, when depressed, permits the cassette holder to pop up to the eject position. This eject bar is so positioned as to conceal the opening of the cassette holder when and so long as the cassette holder is held in the set position. However, the eject bar 10 is maintained in a depressed position when depressed to allow the cassette holder in the set position to move or pop up towards the eject position so that a relatively large access opening can be provided for the insertion and removal of the cassette into and from the cassette holder in the eject position.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Referring first to FIG. 2 showing a video tape recorder to which the present invention has been applied, the video tape recorder comprises a housing H generally constituted by top and bottom walls (only the top wall being shown by Ha), front and rear walls (only the front wall being shown by Hb) and a pair of opposed side walls (only one side wall being shown by Hc), all being assembled to assume a substantially rectangular box-like configuration in a manner well known to those skilled in the art. The top wall Ha has a generally rectangular opening Hd defined therein for accommodating a cassette holder C, the longitudinal extent of said opening Hd being preferably in parallel relation to that of the top wall Ha.

Although the details of the cassette holder C are not shown because they are well known in the art and because the cassette holder C employed in the present invention may be of any known construction, it generally comprises a top panel Ca, a bottom panel Cb (shown in FIG. 4) and a pair of opposed side panels, all being assembled to assume a generally rectangular, open-ended box-like configuration sufficient to accommodate a standardized video tape cassette therein. The cassette holder C of the above described construction has a pair of opposed rectangular openings, one opening being shown by Cc in FIG. 4 and being adapted to receive the tape cassette during the insertion of the tape cassette into the cassette holder C when the latter is in the eject position while the other opening serves to permit a length of magnetic tape in the cassette within the cassette holder C to be led out of the cassette therethrough when the cassette holder C is in the set position.

In accordance with the teachings of the present invention, the opening Hd defined in the top wall Ha of the video tape recorder housing H is of a size having a width, as measured in a direction perpendicular to the longitudinal extent of the top wall Ha, larger than that of the top panel Ca of a cassette holder C thereby leaving a generally elongated opening area necessary to accommodate an eject bar 10 at a location substantially above and slightly rearwardly of the front wall Hb of the video tape recorder housing H in parallel relation to the longitudinal extent of the top panel Ca of the cassette holder C, as best shown in FIG. 2.

Figure 4:
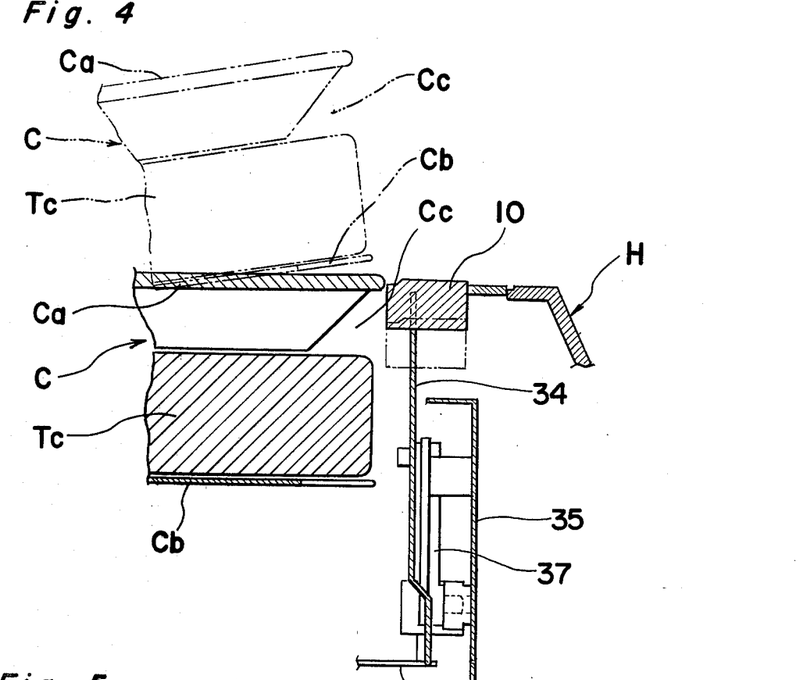
FIG. 4 is a side sectional view of a portion of the video tape recorder of FIG. 2, showing the eject bar and its associated parts.

The eject bar 10 is supported for movement between an upwardly biased position and a depressed position as will be described later and, when it is in the upwardly biased position as shown in FIGS. 3 and 4, the top of the eject bar 10 is held in flush with the top panel Ca of the cassette holder C in the set position, thereby concealing the opening Cc of the cassette holder C as best understood from FIG. 4. However, as will be described later, the eject bar 10 is, when depressed to allow the cassette holder C to be moved towards the eject position as shown by the phantom line in FIG. 4, locked in the depressed position as shown by the phantom line in FIG. 4 with the top of the eject bar 10 positioned beneath, and spaced a distance from, the bottom panel Cb of the cassette holder C so that the eject bar 10 does not provide any obstacle to the passage of the hand holding the cassette in a direction close towards and away from the cassette holder C.

Figure 7:
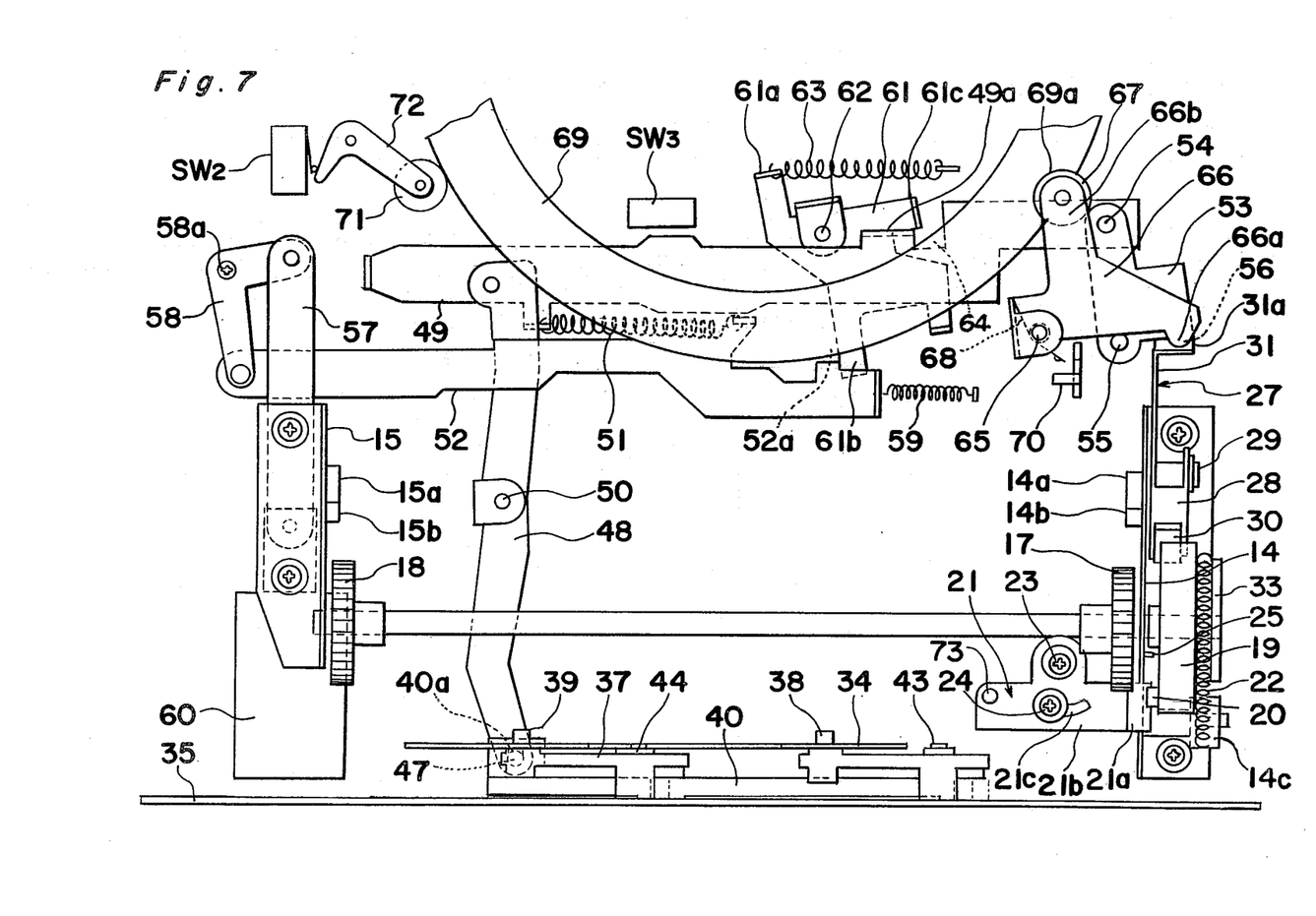
FIGS. 7 and 8 are views similar to FIG. 6, showing the cassette loading and unloading mechanism as assuming different operative positions.
Figure 8:
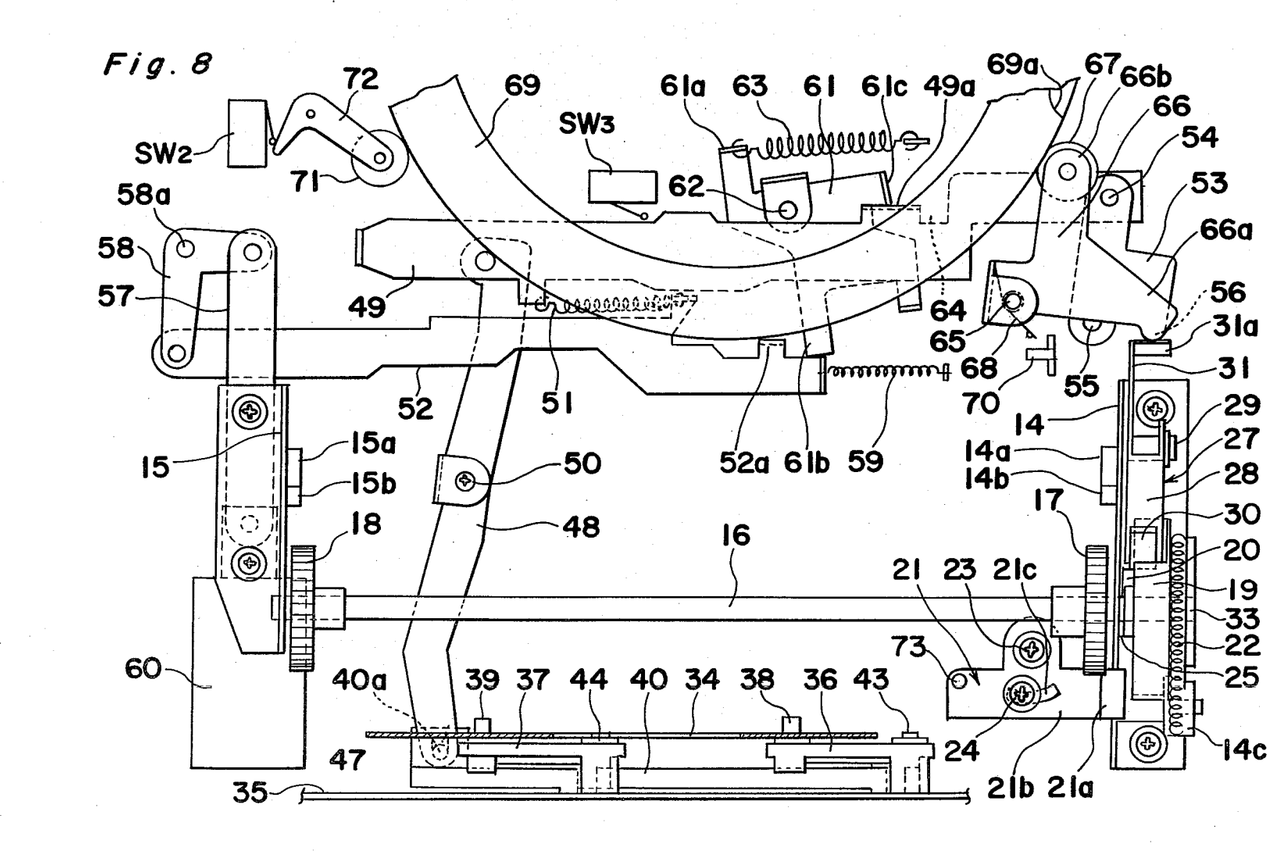
Figure 9:
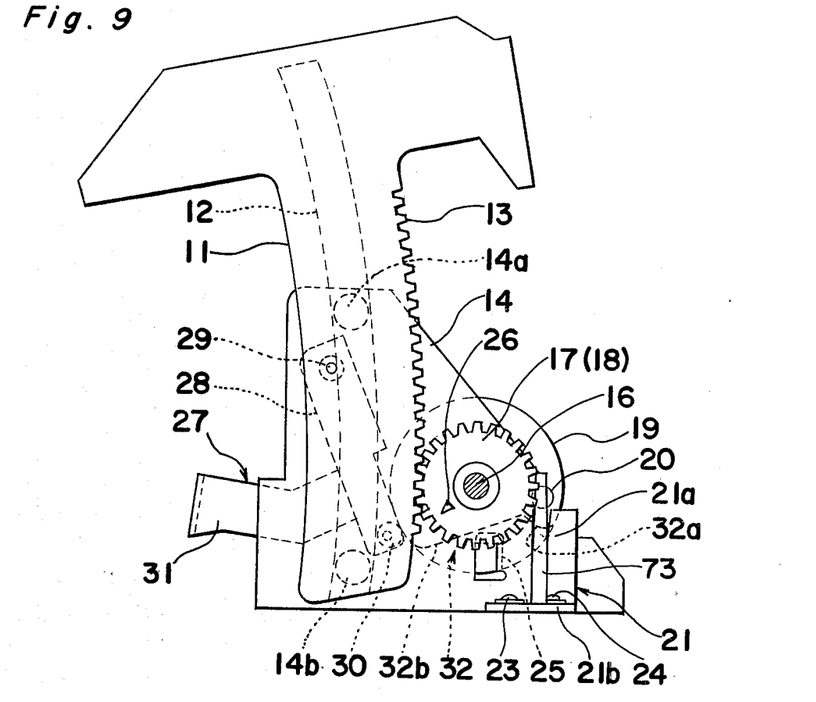
FIG. 9 is a side elevational view of one of the opposed cassette holder support legs and its associated parts in one operative position attained when the cassette holder is in an eject position.
Figure 10:
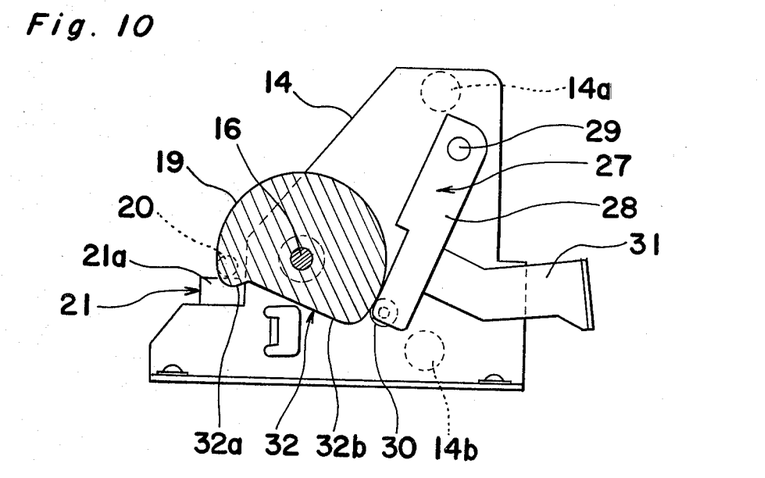
FIG. 10 is a side elevational view of a portion of FIG. 9, as viewed in a direction opposite to FIG. 8.
Figure 11:
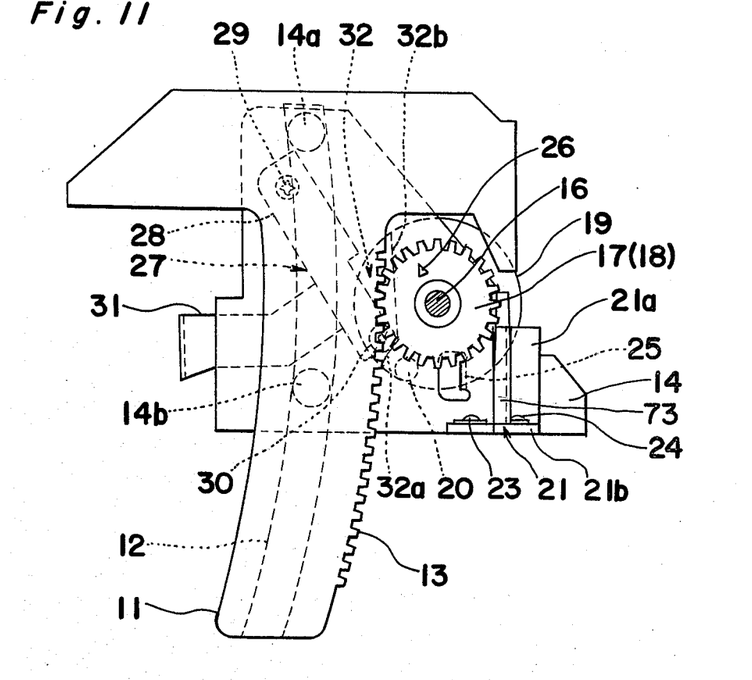
FIG. 11 is a view similar to FIG. 9, showing the support leg and its associated parts in another operative position attained when the cassette holder is in a set position.

Referring now to FIGS. 6 to 14, the details of the cassette loading and unloading mechanism embodying the present invention will first be described. As best shown in FIGS. 9 and 11, the cassette holder C has a pair of identical support legs, only one of which is shown therein by 11, each of said support legs 11 having an upper end portion rigidly connected to, or otherwise integrally formed with, the corresponding side panel of the cassette holder C. Although the support legs 11 may extend straight, so far illustrated they are so curved that, when the cassette holder C is in the eject position as shown by the phantom line in FIG. 4, the opening Cc of the cassette holder C through which the cassette, shown by TC in FIG. 4, can face diagonally upwardly to align with the field of view of the user of the video tape recorder.

Each of the support legs 11 has a guide groove 12 defined therein in parallel relation to the longitudinal extent thereof and is formed at 13 with a rack having a pluarlity of equally spaced teeth defined in one side edge of the respective support leg 11. Since each of the support legs 11 is curved as described above, both the guide groove 12 and the rack 13 are correspondingly curved. It is to be noted that, for the purpose which will become clear from the subsequent description, one end of the guide groove 12 remote from the cassette holder C adjacent the upper end of the respective support leg 11 is opened at the free end face of the respective support leg 11.

Figure 6:
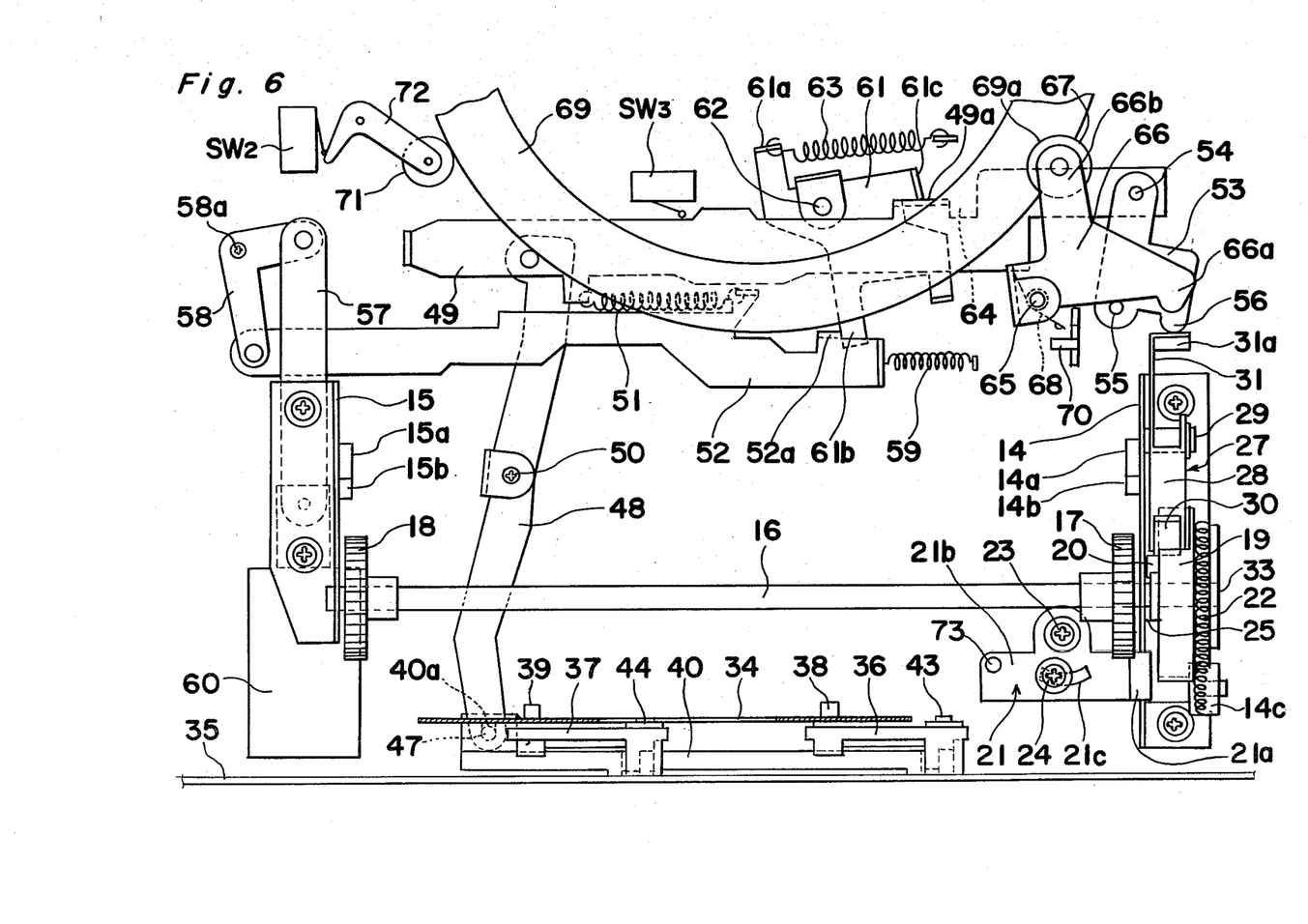
FIG. 6 is a top plan view of the cassette loading and unloading mechanism embodying the present invention, said mechanism being shown as assuming an inoperative position.

Rigidly mounted on a chassis or any suitable framework (not shown) is a pair of generally triangular support plates 14 and 15 which are, as best shown in FIGS. 6 and 7, spaced from each other a distance corresponding to the inside span between the support legs 11. Each of these triangular support plates 14 and 15 has at least two guide pins 14a or 15a and 14b or 15b rigidly secured thereto in spaced relation to each other and protruding therefrom in a direction perpendicular to the respective support plate 14 or 15, the guide pins 14a and 14b in the support plate 14 and the guide pins 15a and 15b in the support plate 15 being respectively aligned with each other. The support legs 11 carrying the cassette holder C are mounted on the support plates 14 and 15 with the guide pins 14a and 14b and the guide pins 15a and 15b engaged respectively in the guide grooves 12 in the associated support legs 11 so that the cassette holder C can move between the eject and set positions in a direction generally perpendicular to the top wall Ha of the video tape recorder housing H, the eject and set positions of the cassette holder C being respectively shown in FIGS. 9 and 11.

As best shown in FIGS. 6 to 8, a shaft 16 extends between the support plates 14 and 15 with its opposed ends rotatably journaled to the respective support plates 14 and 15. Mounted rigidly and axially non-movably on the shaft 16 is a pair of pinion gears 17 and 18 positioned adjacent to the respective support plates 14 and 15 and held in engagement with the respective racks 13 in such a manner as best shown in FIGS. 9 and 11. A cam wheel 19 having a stop pin 20 is rigidly mounted on the shaft 16 at a position on one side of the support plate 14 opposite to the pinion gear 17, the position of the stop pin 20 on the cam wheel 19 being so selected that, when the cassette holder C is in the eject position as shown in FIG. 9, the stop pin 20 can be engaged to the top of an upright portion 21a of a stop member 21 as best shown in FIG. 9, thereby avoiding any possible separation of the cassette holder C from the support plates 14 and 15 which would occur when the cassette holder C is further moved beyond the eject position in a direction opposite to the set position.

In the construction so far described, it is clear that, when the cassette holder C in the eject position as shown in FIG. 9 is downwardly pushed by the application of an external pushing force necessary to move it from the eject position towards the set position as shown in FIG. 11, the movement of the cassette holder C is transmitted to the pinion gears 17 and 18 through the associated racks 13 on the respective support legs 11, thereby rotating the pinion gears 17 and 18 together with the shaft 16 in a counterclockwise direction as viewed in any one of FIGS. 9 and 11 or in a clockwise direction as viewed in any one of FIGS. 9 and 11. However, when the cassette holder C in the set position as shown in FIG. 11 is forced to move from the set position towards the eject position, in such a manner as will be described later, under the influence of a biasing force exerted by a tension spring 22 (FIGS. 6 to 8, 13 and 14) the pinion gears 17 and 18 held in mesh with the respective racks 13 on the support legs 11 are rotated together with the shaft 16 in a clockwise direction as viewed in any one of FIGS. 9 and 11 or in a counterclockwise direction as viewed in any one of FIGS. 10 and 12. It it also clear that, upon arrival of the cassette holder C at the eject position as shown in FIG. 9, the stop pin 20 on the cam wheel 19 rotatable together with the pinion gears 17 and 18 is brought into engagement with the top of the upright portion 21a of the stop member 21.

It may happen that the necessity of removing the cassette holder C including the support legs 11 out from the video tape recorder housing H during servicing. In such case, according to the prior art method, a complicated and time-consuming procedure, for example, undoing a plurality of set screws used to secure the cassette holder to the support legs or the like and/or removing at least the top wall of the video tape recorder housing, has been required. However, in the present invention, this can readily be accomplished merely by displacing the stop member 21 from its correct position relative to the path of travel of the stop pin 20 on the cam wheel 19. This will now be described in details with particular reference to FIGS. 6 to 10, 13 and 14.

Figure 13:
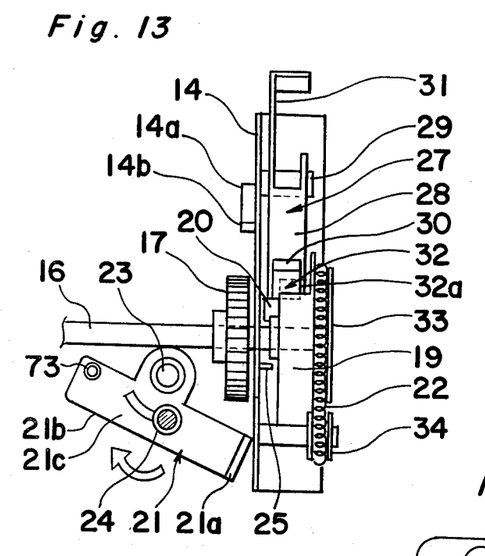
FIG. 13 is a top plan view of a guide structure for the support leg shown in FIGS. 9 and 11, showing the details of a stopper.

Referring now to FIGS. 6 to 10, 13 and 14, the stop member 21 also has a base portion 21b extending in a direction perpendicular to the upright portion 21a and having a curved slot 21c defined therein. This stop member 21 is mounted on the chassis (not shown) by means of any suitable connecting element 23, such as a set screw or a rivet, for pivotal movement between an engaged position, as shown in FIGS. 6 to 10, and a disengaged position as shown in FIG. 13 about the longitudinal axis of the connecting element 23. The curved slot 21c in the base portion 21b of the stop member 21 is so curved as to have a center of curvature occupied by the connecting element 23 and defines the stroke of movement of the stop member 21 between the engaged and disengaged positions. An adjustment screw 24 loosely extends through the curved slot 21c and is then threaded to the chassis.

In the construction described above, the stop member 21 is normally held in the engaged position as shown in FIGS. 6 to 10 with the top of the upright portion 21a thereof positioned on the path of travel of the stop pin 20 on the cam wheel 19 so that, when the cassette holder C is moved or popped up to the eject position, the stop pin 20 on the cam wheel 19 abuts against the top of the upright portion 21a of the stop member 21 as best shown in FIGS. 9 and 10, thereby avoiding any possible separation of the support legs 11 relative to the support plates 14 and 15. At this time, the adjustment screw 24 is firmly fastened to fix the stop member 21 relative to the chassis. However, where the cassete holder C including the support legs 11 is desired to be removed out of the video tape recorder housing H, all that is to be done is to loosen the adjustment screw 24 and then to pivot the stop member 21 from the engaged position towards the disengaged position as best shown in FIG. 13. By so doing, since the top of the upright portion 21a of the stop member 21 is moved away from the path of travel of the stop pin 20 on the cam wheel 19, only a single pull of the cassette holder C allows the racks 13 on the respective support legs 11 to be disengaged from the corresponding pinion gears 17 and 18.

Figure 14:
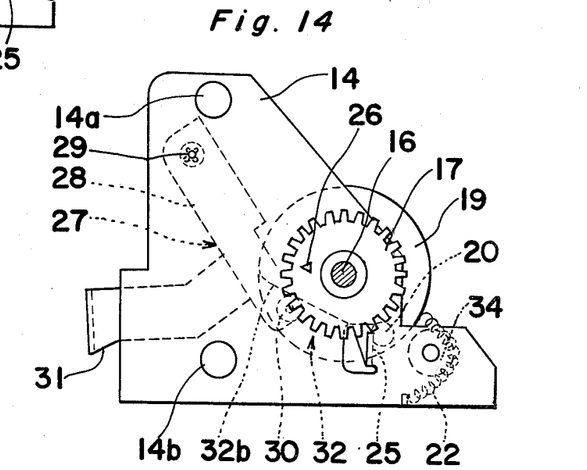
FIG. 14 is a view similar to FIGS. 9 and 11, showing the position of a cam wheel to be attained during the removal of the cassette holder.

Once the racks 13 on the respective support legs 11 are disengaged from the corresponding pinion gears 17 and 18 with the cassette holder C removed out of the video tape recorder housing H in the manner described above, the pinion gears 17 and 18, connected with each other by means of the shaft 16, are further rotated in a direction clockwise as viewed in FIGS. 9 and 14 under the influence of the biasing force of the tension spring 22. If the pinion gears 17 and 18 are excessively rotated clockwise after the removal of the cassette holder C, there is the possibility that remounting or repositioning of the cassette holder C relative to the pinion gears 17 and 18 would become difficult because the cam wheel 19 rigidly mounted on the shaft 16 together with the pinion gears 17 and 18 will go out of order relative to other movable parts associated and/or governed by such cam wheel 19. In order to avoid this possibility, as best shown in FIGS. 13 and 14, an engagement 25 is provided for this purpose. This engagement 25 is rigidly connected to, or otherwise integrally formed with the support plate 14 and protruds therefrom into the path of travel of the stop pin 20 on the cam wheel 19, the position of the engagement 25 being so selected that, when the stop pin 20 on the cam wheel 19 is, after having been disengaged from the top of the upright portion 21a of the stop member 21 in the disengaged position as shown in FIG. 13, engaged to the engagement 25, the racks 13 on the respective support legs 11 are completely disengaged from the associated pinion gears 17 and 18.

When the cassette holder C removed out of the video tape recorder housing H in the manner described above is to be remounted, what is required to do is to insert the support legs 11 with the guide pins 14a and 14b on the support plate 14 and the guide pins 15a and 15b on the support plate 15 received in the corresponding guide grooves 12 in the respective support legs 11. By so doing, the racks 13 on the respective support legs 11 are engaged to the associated pinion gears 17 and 18, and, when the pinion gears 17 and 18 are rotated in a direction counterclockwise as viewed in FIGS. 8 and 13 to such an extent as to permit the stop pin 20 on the cam wheel 19 to move past the position which would be occupied by the top of the upright portion 21a of the stop member 21 when the latter is in the engaged position, the stop member 21 once moved to the disengaged position has to be moved to the engaged position and the adjustment screw 24 is thereafter tightly fastened.

It is to be noted that, although the stop pin 20 and the engagement 25 have been described and shown as provided on the cam wheel 19 and the support plate 14, respectively, they may be provided on the pinion gear 17 and either the chassis or the support plate 14. It is also to be noted that, in order to render the position of the stop pin 20 relative to the stop member 21 to be readily and visually ascertainable, the pinion gear 17 may have a generally arrow-shaped indent formed thereon at 26 as best shown in FIGS. 9, 11 and 14.

Hereinafter, a releaseable locking mechanism necessary to lock the cassette holder C in the set position when and after it has been moved thereto by the application of an external force thereto, and also to release the cassette holder C from the set position will be described with particular reference to FIGS. 6 to 12.

The support plate 14 carries a generally T-shaped locking lever 27 constituted by an arm section 28, having one end pivotally connected at 29 to the support plate 14 and the other end carrying a roller element 30, and a leg section 31 having one end integrally formed with, or otherwise rigidly connected to a substantially intermediate portion of the arm section 28 and protruding therefrom in a direction opposite to the cam wheel 19. The position of the point of pivot 29 of the locking lever 27 is, so far in the illustrated embodiment, so selected that the roller element 30 can always be held in contact with the periphery of the cam wheel 19 with the locking lever 27 tending to rotate in a clockwise direction about the point of pivot 29 to assume the state of equilibrium under the influence of a gravitational force.

Figure 12:
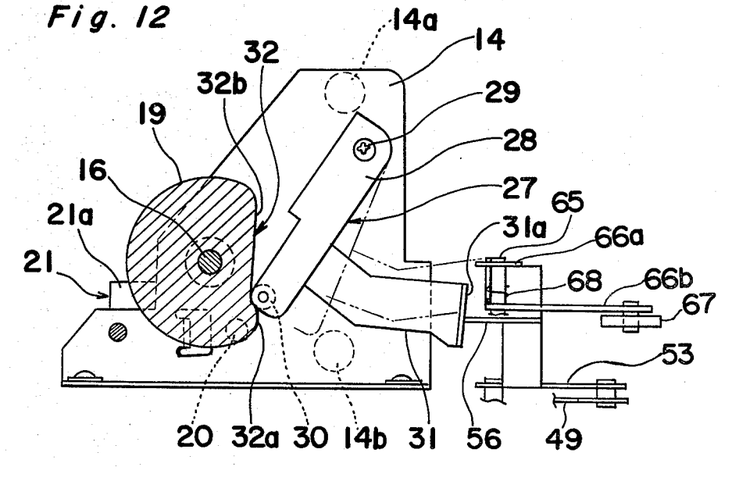
FIG. 12 is a side elevational view of a portion of FIG. 11, as viewed in a direction opposite to FIG. 11.

The cam wheel 19 cooperative with the locking lever 27 has a detent recess 32 defined therein by a steep slope 32a and a gentle slope 32b as best shown in FIGS. 10 and 12. This detent recess in the cam wheel 19 is so shaped and so positioned relative to the locking lever 27 that, when and so long as the cassette holder C is in the set position, the roller element 30 is engaged in the bottom of the detent recess 32 as best shown in FIG. 12, but, as the cassette holder C is moved from the set position towards the eject position as shown in FIG. 9, the roller element 30 slides over the steep slope 32a onto the periphery of the cam wheel 19 and then rolls over the periphery of the cam wheel 19 from one end to another end adjacent the gentle slope 32b remote from the steep slope 32a as best shown in FIG. 10. Since the locking lever 27 pivots about the point of pivot 29 as the roller element 30 slides over and down the steep slope 32a during the rotation of the cam wheel 19 in a respective direction accompanied by the rotation of the pinion gears 17 and 19, the leg section 31 of the locking lever 27 assumes an engaged position when the roller element 30 is held in the bottom of the detent recess 32 as shown by the solid line in FIG. 12 and a disengaged position when the roller element 30 is held in contact with the periphery of the cam wheel 19 as shown in FIG. 10 and by the phantom line in FIG. 12, the function of said leg section 31 being described in details later. Referring to FIG. 14, when the cassette holder C is removed out of the video tape recorder housing H in the manner as hereinbefore described and when the stop pin 20 on the cam wheel 19 is engaged to the engagement 25 fast with the support plate 14, the roller element 30 on the arm section 28 of the locking lever rests on the gentle slope 32b after having slid down from the periphery of the cam wheel 19 onto it.

As best shown in FIGS. 6 to 8 and 13, one end face of the cam wheel 19 remote from the support plate 14 is formed integrally with, or otherwise connected with, a traction wheel 33 having a circumferentially extending groove defined on the peripheral face thereof, which traction wheel 33 may be either concentric or eccentric with the shaft 16. It is the circumferentially extending groove on the traction wheel 33 that the tension spring 22 is turned for biasing the shaft 16 to rotate clockwise as viewed in FIGS. 9, 11 and 14. For this purpose, the tension spring 22 has one end rigidly connected to the traction wheel 33 and the other end rigidly connected to the chassis or the support plate 14, a substantially intermediate portion being, after having been turned around the traction wheel 33, turned around an idle roller 14c rotatably carried by the support plate 14 as best shown in FIGS. 6 to 8 and 14. In this way, the biasing force of the tension spring 22 necessary to urge the cassette holder C to move towards the eject position can be transmitted to the support legs 11 through the shaft 16 and then through the pinion gears 17 and 18. It is to be noted that, instead of turning the tension spring 22 around the traction wheel 33, a traction cable may be used. Where the traction cable is used, one end of the traction cable should be rigidly connected to the traction wheel 33 and the other end thereof should be connected to the chassis through a tension spring necessary to keep the traction cable in tension.

The locking lever 27 is operatively associated with the eject bar 10 by means of a linkage system which will now be described with particular reference to FIGS. 3 to 8.

Figure 5:
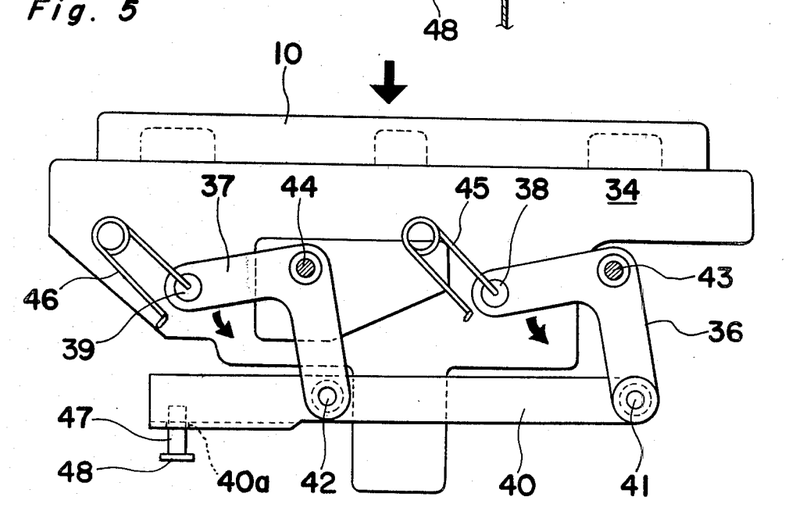
FIG. 5 is a view similar to FIG. 3, showing the eject bar held in a depressed position.

As best shown in FIGS. 3 and 5, the eject bar 10 is rigidly mounted on a plate member 34 supported for movement together with the eject bar 10 by a front support panel 35 (FIGS. 6 to 8), rigidly mounted on the chassis, through a pair of spaced, generally L-shaped links 36 and 37. More specifically, each of the L-shaped links 36 and 37 has one end pivotally connected to the plate member 34 by means of a respective pivot pin 38 or 39 and the other end pivotally connected to a slide link 40 by means of a respective pivot pin 41 or 42, a substantially intermediate, bent portion of said respective L-shaped link 36 or 37 being pivotally connected to the front support panel 35 by means of a corresponding pivot pin 43 or 44. The eject bar 10 are normally biased to the upwardly biased position together with the plate member 34 by the action of a pair of spaced wire springs 45 and 46 each having one end connected to the corresponding pivot pin 38 or 39 and the other end fixedly connected to the front support panel 35. It is to be noted that, instead of the employment of the wire springs 45 and 46 such as shown as means for urging the eject bar 10 to the upwardly biased position, any other spring elements such as compression springs, tension springs or leaf springs, may be employed. In addition, should any suitable guide means for guiding the plate member 34 to move in a linear direction be employed, one of the L-shaped links 36 and 37 and its associated parts including the wire spring 45 or 46 may be omitted.

The slide link 40 is supported by the front support panel 34 through the L-shaped links 36 and 37 in the manner as hereinabove described for movement between first and second positions in response to the movement of the eject bar 10 between the upwardly biased and depressed positions, respectively. This slide link 40 has an engagement recess 40a defined therein, into which engagement recess 40a a connecting pin 47 rigidly mounted on a transmission lever 48 loosely extends. This transmission lever 48 has one end carrying the connecting pin 47 described above and the other end pivotally coupled to a slide 49, a substantially intermediate portion of said lever 48 being pivotally mounted on the chassis by means of a pivot pin 50. In this construction, it is clear that, when the eject bar 10 is depressed, that is, moved from the upwardly biased position towards the depressed position, as shown in FIG. 5, by the application of an external pushing force, the slide link 40 is moved from the first position, as shown in FIG. 3, towards the second position as shown in FIG. 5, causing the transmission lever 48 to pivot counterclockwise about the pivot pin 50 as shown in FIG. 7.

As best shown in FIGS. 6 to 8, the slide 49 is supported on the chassis in any suitable manner, for example, by the employment of any known guiding means, for movement between a first operative position, as shown in FIG. 6, and a second operative position as shown in FIG. 7. The first and second operative positions of the slide 49 correspond to the upwardly biased and depressed positions of the eject bar 10, respectively. This slide 49 is normally urged to assume the first operative position, as shown in FIG. 6, by the action of a spring element 51, that is, a tension spring so far illustrated, connected between the slide 49 and a drive link 52. The drive link 52 is supported on the chassis in any suitable manner, for example, by the employment of any known guiding means for movement between first and second operative positions in a direction generally parallel to the longitudinal extent of the slide 49.

One end of the slide 49 remote from the point of pivotal connection of the transmission lever 48 thereto is coupled to a first locking lever 53 having one end pivotally connected at 54 to the first locking lever 53 and the other end pivotally mounted at 55 on the chassis. This first locking lever 53 has, as best shown in FIG. 12, an engagement projection 56 connected thereto or otherwise integrally formed therewith, the free end of said engagement projection 56 being engageable with a foot 31a of the leg section 31 of the locking lever 27. More specifically, the engagement projection 56 on the first locking lever 53 is so designed and so shaped relative to the foot 31a of the leg section 31 of the locking lever 27 that, when and so long as the eject bar 10 is in the upwardly biased position and the slide 49 is accordingly held in the first operative position, the free end of the engagement projection 56 is held in position to urge the locking lever 27 clockwise, as viewed in FIG. 12, about the point of pivot 29 with the roller element 30 on the arm section 28 of the locking lever 27 firmly engaged in the detent recess 32 on the cam wheel 19 as best shown in FIG. 12, thereby locking the cassette holder C in the set position. However, when and so long as the eject bar 10 is moved from the upwardly biased position towards the depressed position and the slide 49 is accordingly moved from the first operative position towards the second operative position in a manner as will be described later, the first locking lever 53 is pivoted counterclockwise, as viewed in FIGS. 6 to 8, about the pivot 55 with the free end of the engagement projection 56 tending to separate away from the foot 31a of the leg section 31 of the locking lever 27 so that the cam wheel 19 can rotate counterclockwise as viewed in FIG. 12 by the action of the tension spring 22, causing the roller element 30 to ride over the steep slope 32a to enable the cassette holder C to move from the set position towards the eject position. It is to be noted that, at the time of completion of the movement of the cassette holder C to the eject position with the roller element 30 resting on the periphery of the cam wheel 19 in the manner as best shown in FIG. 10, the free end of the engagement projection 56 on the first locking lever 53 is held in contact with the foot 31a of the leg section 31 of the locking lever 27, thereby locking the slide 49 in the second operative position as best shown in FIG. 7. The locking of the slide 49 in the second operative position while the locking lever 27 assumes the position as shown in FIG. 10 and as shown by the phantom line in FIG. 12 means that the eject bar 10 is maintained in the depressed position, at which time the cassette holder C is in the eject position.

Figure 15:
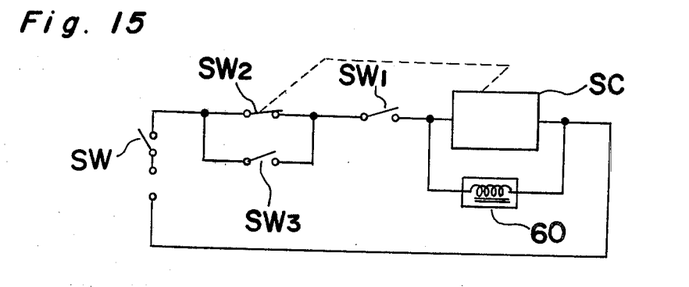
FIG. 15 is a schematic electric circuit diagram showing an electric control circuit for controlling the operation of the cassette loading and unloading mechanism.

The locking of the slide 49 in the second operative position in the manner described above is achieved mechanically, that is, without the involvement of an electric control circuit shown in FIG. 15. However, it is also possible to lock the slide 49 in the second operative position electromechanically while the cassette holder C is still retained in the set position with the roller element 30 firmly engaged in the detent recess 32. A mechanism necessary to achieve this will now be described.

Referring still to FIGS. 6 to 8, the drive link 52 has one end pivotally connected to a solenoid plunger 57 by means of a generally L-shaped connecting link 58, pivotally mounted on the chassis by means of a pivot pin 58a, and the other end coupled to the chassis by means of a tension spring 59. The solenoid plunger 57 forms a part of a solenoid unit 60 which is so designed that, when the solenoid unit 60 is electrically energized in a manner as will be described later, the plunger 57 is moved to a retracted position, but, when and so long as the solenoid unit 60 is deenergized, the plunger 57 is moved to a projected position. In any event, the solenoid unit 60 including the solenoid plunger 57 is of any known construction and, therefore, the details thereof will not be described. The spring element 59 serves to urge the drive link 52 to assume the first operative position as shown in FIG. 6 and also to position the plunger 57 at the projected position during the deenergization of the solenoid unit 60. So far described, the drive link 52 is, when the solenoid unit 60 is energized with the plunger 57 consequently held in the retracted position as shown in FIG. 8, moved to the second operative position against the spring 59, said drive link 52 being, however, held in the first operative position by the action of the tension spring 59 during the deenergization of the solenoid unit 60. It is to be noted that the spring 59 may not be always necessary if a spring element necessary to hold the plunger 57 in the projected position during the deenergization of the solenoid unit 60 is built in the solenoid unit 60.

The slide 49 can also be locked in the second operative position when moved thereto and, at the same time, when the drive link 52 is moved to the second operative position. For this purpose, there is employed a latching lever 61 pivotally mounted on the chassis by means of a pivot pin 62. This latching lever 61 has first, second and third tongues 61a, 61b 61c formed integrally therewith and is normally biased so as to rotate clockwise, as viewed in FIGS. 6 to 8, about the pivot pin 62 by the action of a tension spring 63 interposed between the first tongue 61a and the chassis. With the latching lever 61 so biased by the tension spring 63, the second tongue 61b of the latching lever 61 is constantly engaged to an engagement upright 52a, rigidly mounted on or integrally formed with the drive link 52, and the third tongue 61c of the latching lever 61 may, when and so long as the drive link 52 is held in the first operative position without the solenoid unit 60 being energized such as shown in FIG. 6, be either spaced a slight distance from or held in contact with a ridge portion 49a formed integrally with and protruding laterally from the slide 49. More specifically, the latching lever 61 is so designed and so shaped as to function in a manner as described below.

(a) Assuming that the slide 49 has already been moved to the second operative position as shown in FIG. 7 incident to the movement of the eject bar 10 from the upwardly biased position to the depressed position, the subsequent movement of the drive link 52 from the first operative position, as shown in FIG. 6, towards the second operative position as shown in FIG. 7 is accompanied by a corresponding angular movement of the latching lever 61 which takes place by the action of the tension spring 63 with the second tongue 61b engaged to and moving in pursuit of the engagement upright 52a. At this time, the third tongue 61c of the latching lever 61 may either slide over or move idle relative to the ridge portion 49a on the slide 49. At the time of completion of the movement of the drive link 52 to the second operative position, the third tongue 61c of the latching lever 61 being pivoted in the manner described above falls into a recess defined at 64 on one side of the ridge portion 49a adjacent the first locking lever 53, thereby locking the slide 49 in the second operative position as shown in FIG. 7.

(b) Assuming that the drive link 52 has already been moved to the second operative position incident to the energization of the solenoid unit 60, the latching lever 61 remains in the position as shown in FIG. 6 with the third tongue 61c held in contact with the ridge portion 49a and also with the second tongue 61b separated away from the engagement upright 52a. However, the subsequent movement of the slide 49 from the first operative position towards the second operative position incident to the movement of the eject bar 10 from the upwardly biased position towards the depressed position results in a relative sliding movement of the third tongue 61c on the ridge portion 49a. At the time of completion of the movement of the slide 49 to the second operative position, the third tongue 61c of the latching lever 61 falls into the recess 64 thereby locking the slide 49 in the second operative position as shown in FIG. 7.

It is to be noted that whether the movement of the slide 49 towards the second operative position takes place prior to the movement of the drive link 52 towards the second operative position or whether the movement of the drive link 52 towards the second operative position takes place prior to the movement of the slide 49 towards the second operative position depends on whether the eject bar 10 is manipulated prior to the switching-on of the power main switch SW (FIG. 15) or whether the power main switch SW is turned on prior to the manipulation of the eject bar 10, as will be discussed in more details later.

Pivotally mounted on the chassis by means of a pivot pin 65 and positioned adjacent the first locking lever 53 is a second locking lever 66. This second locking lever 66 has a pair of arms 66a and 66b extending outwardly therefrom so as to diverge with respect to each other and displaced one above the other, that is, with the arm 66a positioned above the arm 66b as best shown in FIG. 12. The second locking lever 66 carries a roller element 67 rotatably mounted on the arm 66b and is normally biased counterclockwise about the pivot pin 65 by the action of a spring element 68, that is, a wire spring so far illustrated, with the roller element 67 urged close towards a tape loading and unloading ring 69, the function of the tape loading and unloading ring 69 being described later. On the other hand, the tip of the arm 66a of the second locking lever 66 is engageable with the foot 31a in the locking lever 27 in a manner as will be described later.

The tape loading and unloading ring 69 is supported on the chassis with the center of the circle of the ring 69 held in offset relation to the longitudinal axis of the guide cylinder (not shown) positioned inside the ring 69 and having one or more known magnetic recording and/or reproducing heads operatively accommodated therein. The tape loading and unloading ring 69 is adapted to be driven by an electric reversible motor (not shown) between inoperative and operative positions and serves to turn a length of magnetic tape around the guide cylinder through a predetermined angle, for example, 260°, in readiness for the recording or playback of the video information on the magnetic tape as it rotates from the inoperative position towards the operative position and also to release that length of magnetic tape from the guide cylinder as it rotates from the operative position towards the inoperative position. The reversible motor for the loading and unloading ring 69 is also operatively coupled to a tape supply spindle (not shown) for driving the tape supply spindle in one direction to allow the length of magnetic tape to be drawn out of the tape cassette and then to turn it around the guide cylinder during the rotation of the ring 69 from the inoperative position towards the operative position and also for driving the tape supply spindle in the opposite direction to allow that length of magnetic tape to be released from the guide cylinder and then to be drawn into the cassette during the rotation of the ring 69 from the operative position towards the inoperative position.

In any event, the detailed construction and function of the tape loading and unloading ring 69 and its associated parts are disclosed in the U.S. Pat. No. 3,871,025 and, therefore, reference may be had thereto. However, for the purpose of the present invention, the tape loading and unloading ring 69 is formed with a detent recess 69a into which the roller element 67 carried by the second locking lever 66 is received when and so long as the ring 69 is in the inoperative position as shown in FIGS. 6 to 8.

The second locking lever 66 is operable only when the cassette holder C having the tape cassette TC loaded or inserted therein is moved to the set position and, at the same time, when the power main switch SW. is turned on. More specifically, whereas the cassette holder C is locked in the set position by the first locking lever 53, with the slide 49 held in the first operative position, when and so long as the tape recorder is not in use, it can be locked in the set position by the second locking lever 66 when and so long as the tape recorder is in use with the power switch SW turned on. This will now be described in connection with the operation of the cassette loading and unloading device of the present invention and with reference to the control circuit shown in FIG. 15. However, it is to be noted that, in view of the fact that the cassette loading and unloading device embodying the present invention can be manipulated in some different ways, the operation thereof will be described item to item according to the different manner by which the device is manipulated.

(I) POWER SWITCH SW TURNED OFF

When and so long as the main power switch SW is turned off, all of the solenoid unit 60, the drive link 52, the latching lever 61 and the second locking lever 66 do not operate. In this condition, assuming that the empty cassette holder C is held in the set position and is, therefore, desired to be popped up to the eject position, what is required to do is to apply a single push to the eject bar 10. By the application of the single push, the eject bar 10 is moved from the upwardly biased position towards the depressed position, the movement of the eject bar 10 being transmitted to the slide 49, thereby causing the slide 49 to move from the first operative position towards the second operative position against the tension spring 51. The movement of the slide 49 towards the second operative position is accompanied by the counterclockwise pivotal movement of the first locking lever 53 about the pivot pin 55 with the tip of the engagement projection 56 consequently tending to separate away from the foot 31a in the locking lever 27 while the locking lever 27 pivots counterclockwise, as viewed in FIG. 12, with the roller element 30 tending to ride over the steep slope 32a on the cam wheel 19 then urged to rotate counterclockwise, as viewed in FIG. 12, by the action of the tension spring 22. Because of the pivotal movement of the locking lever 27 in the manner described above, the foot 31a of the leg section 31 of the locking lever 27 moves in pursuit of the tip of the engagement projection 56 on the first locking lever 53.

Upon completion of the movement of the slide 49 to the second operative position as shown in FIG. 7, the roller element 30 has ridden over the steep slope 32a onto the periphery of the cam wheel 19 and, accordingly, the cassette holder C is allowed to pop up towards the eject position by the action of the tension spring 22. At the same time, because the foot 31a on the leg section 31 of the locking lever 27 blocks the movement of the first locking lever 53 tending to return to the original position by the action of the tension spring 51 transmitted thereto through the slide 49, the slide 49 is locked in the second operative position and, therefore, the eject bar 10 is locked in the depressed position.

The application of a single push to the cassette holder C in the eject position to move it from the eject position towards the set position allows the return of the eject bar 10 from the depressed position towards the upwardly biased position in a manner substantially reverse to that described above.

(II) POWER SWITCH SW TURNED ON

When the power switch SW is turned on, two possibilities must be taken into consideration, that is, whether or not the tape cassette TC is loaded in the cassette holder C. In the case where the tape cassette TC is not loaded in the cassette holder C, a normally opened detector switch SW1 having a feeler 70 (FIGS. 6 to 8) and adapted to be closed when the cassette TC within the cassette holder C contact it during the positioning of the cassette holder C at the set position is opened, and the control circuit shown in FIG. 15 is inoperative as is the case with the main power switch SW turned off. Accordingly, in such case, the cassette loading and unloading device operates in the same manner as in the case where the main power switch SW is turned off and as described above.

However, after the power switch SW has been turned on and after the cassette holder C in the eject position has received the tape cassette TC therein subsequent to or prior to the turning-on of the power switch SW, what is to be done is to push the loaded cassette holder C, that is, the cassette holder C with the tape cassette TC therein, to move the latter from the eject position towards the set position. Shortly before the completion of the movement of the loaded cassette holder C to the set position, the slide 49 is allowed to return from the second operative position towards the first operative position by the action of the tension spring 51. This is because the roller element 30 on the locking lever 27 that has rolled over the periphery of the cam wheel 19 falls into the detent recess 32 in the cam wheel 19 with the foot 31a of the leg section 31 of the locking lever 27 displaced in a direction away from the first locking lever 53.

At the time of completion of the movement of the loaded cassette holder C to the set position, the detector switch SW1 is closed by the detection of the presence of the cassette TC within the cassette holder C. Since a normally closed control switch SW2 (FIGS. 6 to 8 and 15), which is adapted to be opened when a roller element 71 carried by a pivotally supported arm member 72 is engaged into the detent recess 69a in the loading and unloading ring 69 with the latter held at the operative position, is series-connected in a circuit with the power main switch SW and the detector switch SW1, an electric power from a suitable power source is supplied through the normally closed control switch SW2 both to a motor switching circuit SC and to the solenoid unit 60. The motor switching circuit SC is of any known construction and is to be understood as operable to drive the drive motor for the ring 69 in one direction from the inoperative position towards the operative position when the switch SW2 is in the closed position and also to drive the drive motor for the ring 69 in the opposite direction when the switch SW2 is in the opened position. Other than the motor switching circuit SC of the type described above, any known switching circuit may be employed provided that it serves to drive the motor in said one direction and reverse it in said opposite direction in response to the positioning of the ring 69 at the inoperative and operative positions, respectively.

Accordingly, the loading and unloading ring 69 is driven from the inoperative position towards the operative position to turn a length of magnetic tape around the guide cylinder, in the manner well known to those skilled in the art and discussed in the previously mentioned U.S. patent, after having drawn it out of the tape cassette TC within the cassette holder C in the set position. Simultaneously with the start of rotation of the loading and unloading ring 69, the roller element 67 carried by the locking lever 66 escapes from the detent recess 69a and onto the outer peripheral face of the ring 69, pivoting the second locking lever 66 clockwise about the pivot pin 65 against the spring element 68, thereby bringing the arm 66a in position to lock the locking lever 27 with the roller element 30 firmly engaged in the detent recess 32 in the cam wheel 19 as shown in FIG. 8. By so doing, it is clear that, during the operation of the video tape recorder, that is, during the recording or playback of the video information on the magnetic tape within the tape cassette TC, any possible depression of the eject bar 10 does not result in popping-up of the cassette holder C to the eject position on account of the fact that the second locking lever 66 locking the locking lever 27 in the manner as shown in FIG. 8.

FIG. 8 illustrates the condition of the cassette loading and unloading mechanism which is attained shortly after the loaded cassette holder C has been moved to the set position and the drive link 52 has subsequently been locked in the second operative position on account of the energization of the solenoid unit 60.

At the time the loading and unloading ring 69 being rotated from the inoperaative position arrives at the operative position, the roller element 71 is trapped into the detent recess 69a in the ring 69, thereby opening the normally closed control switch SW2.

In this way, the recording or playback of the video information on the magnetic tape can be performed.

After the recording or playback of the video information has completed and when the eject bar 10 is depressed in readiness for the removal or replacement of the tape cassette TC, the slide 49 is moved from the first operative position towards the second operative position against the tension spring 51. During this movement, a normally opened eject switch SW3, electrically connected in parallel relation to the control switch SW2, is closed in contact with a cam portion 49b (FIGS. 6 to 8) defined on the slide 49 and, accordingly, an electric power from the power source is again supplied through the eject switch SW3 both to the motor switching circuit SC and to the solenoid unit 60. By this reason, while the drive link 52 is held in the second operative position on account of the energization of the solenoid unit 60, the motor switching circuit SC causes the drive motor for the ring 69 to rotate the latter in the opposite direction from the operative position towards the inoperative position.

Simultaneously with the closure of the eject switch SW3, the latching lever 61 is permitted to pivot clockwise about the pivot pin 62 with the second tongue 61b held in engagement with the engagement upright 52a on the drive link 52 then moved towards the second operative position and, accordingly, the slide 49 is locked at the second operative position by the latching lever 61 with the third tongue 61c engaged in the recess 64. This in turn results in that the first locking lever 53 is pivoted counterclockwise about the pivot pin 55 with the engagement projection 56 separating away from the foot 31a in the locking lever 27. However, the loaded cassette holder C is still held in the set position because of the roller element 67 relatively rolling over the peripheral face of the loading and unloading ring 69.

Upon return of the ring 69 back to the inoperative position, the roller element 67 is engaged into the detent recess 69a in the ring 69 with the second locking lever 66 pivoted counterclockwise about the pivot pin 65 by the action of the spring element 68 with the arm 66a departing from the foot 31, allowing the cassette holder C to be automatically popped up towards the eject position by the action of the tension spring 22 in the manner as hereinbefore described.

Subsequent switching-off of the power switch SW results in the return of the various electro-mechanically operated parts of the cassette loading and unloading mechanism and their associated parts back to the respective initial positions as shown in FIG. 6.

Although the present invention has fully been described in connection with the preferred embodiment thereof with reference to the accompanying drawings, it is to be noted that various changes and modifications are apparent to those skilled in the art. By way of example, the number of the support legs 11 may not be limited to two such as described and shown, but it may be one. In addition, the stop member 21 may have an upright manipulatable rod such as shown by 73 so that the stop member 21 can readily be moved when the adjustment screw 24 is loosened. Moreover, the circuit shown in FIG. 15 is only for the purpose of illustration and for facilitating a better understanding of the systematized motion of the various movable parts of the cassette loading and unloading device of the present invention and is not the complete one for practical use. Accordingly, the circuit is open to various changes and modifications by those skilled in the art.

Therefore, such changes and modifications readily conceivable by and obvious to those skilled in the art from the present disclosure of the invention are to be understood as included within the true scope of the present invention.

What is claimed is:

1. A cassette loading and unloading mechanism for a video tape recorder comprising a recorder housing constituted by top and bottom walls and a surrounding side wall, all of these walls being assembled together to provide a substantially container-like configuration, and a cassette holder having a generally rectangular entrance through which a video tape cassette is selectively inserted into and removed from the cassette holder, said cassette holder being supported for movement between the eject position, in which the cassette holder is positioned outside the housing and upwardly of the top wall in readiness for the insertion and removal of the tape cassette into and from the cassette holder, respectively, and the set position in which the cassette holder is positioned inside the housing with the top of said cassette holder held in flush with the top wall, said cassette loading and unloading mechanism comprising, in combination:

a first support means for supporting the cassette holder for movement between the eject and set positions;

a first biasing means for urging the cassette holder to assume the eject position;

an eject bar positioned frontwardly of the cassette holder in the set position and having its longitudinal extent extending in parallel to the top wall;

a second support means for supporting the eject bar for movement between upwardly biased and depressed positions, said eject bar when in the upwardly biased position concealing the entrance of the cassette holder, said eject bar when moved to the depressed position permitting the cassette holder to move from the set position towards the eject position;

a second biasing means for urging the eject bar to assume the upwardly biased position;

a first releasable locking means for locking the cassette holder in the set position when and after the cassette holder has been moved thereto and also for releasing the cassette holder from the set position to enable the cassette holder to move towards the eject position by the action of the first biasing means in response to the arrival of the eject bar at the depressed position; and a second releasable locking means for locking the eject bar in the depressed position when and after the eject bar has been moved thereto and also for releasing the eject bar from the depressed position to enable the eject bar to move towards the upwardly biased position by the action of the second biasing means in response to the arrival of the cassette holder at the set position.

2. A mechanism as claimed in claim 1, further comprising a detector for detecting the presence and absence of the tape cassette within the cassette holder, said detector being operable only when the cassette holder is moved to the set position, a loading and unloading ring means supported for rotation between inoperative and operative positions, said ring means during the rotation from inoperative position towards the operative position turning a portion of magnetic tape within the cassette around a guide cylinder of the video tape recorder and, during the rotation from the operative position towards the inoperative position unwinding that portion of the tape from the guide cylinder and into the tape cassette, said ring means being operable only when the detector is in position to detect the presence of the tape cassette within the cassette holder, and a third releasable locking means operable only during the period, in which the ring means has been departed from the inoperative position, for locking the cassette holder in the set position, said first releaseable locking means releasing the cassette holder from the set position in response to both the arrival of the cassette holder at the set position and the return of the ring means back to the inoperative position.

3. A mechanism as claimed in claim 1 or 2, wherein the first support means comprises at least one leg member having a series of rack gears defined therein in parallel relation to the longitudinal extent of said leg member, a pinion gear rotatably supported on a chassis member and held in engagement with the rack gears, and a stopper means for defining the eject position of the cassette holder.

4. A mechanism as claimed in claim 3, wherein the stopper means comprises a stop pin rotatable together with the pinion gear during the movement of the cassette holder between the eject and set positions and a stop member adjustably mounted on the chassis member for movement between engaged and disengaged positions, said stop member having an engagement portion which is, when the stop member is moved to the engaged position, located on the path of travel of the stop pin, but which is located clear of the path of travel of the stop pin when moved to the disengaged position, whereby the cassette holder can be removed out of the recorder housing with the rack gears disengaged from the pinion gear.

5. A mechanism as claimed in claim 4, wherein the stop member includes a generally elongated threaded adjustment member loosely extending through a guide slot defined in the stop member and threadingly engaged to the chassis member, the movement of the stop member between the engaged and disengaged positions being effected only when the adjustment member is loosened.

* * * * *